United States Patent [19]
Funaya

[11] Patent Number: 6,062,839
[45] Date of Patent: May 16, 2000

[54] INSERTION UNIT FOR INSERTING PULL TABS OF SLIDERS OF SLIDE FASTENERS INTO AN INSERT MOLDING MACHINE

[75] Inventor: Kazuhiro Funaya, Toyama-ken, Japan

[73] Assignee: YKK Corporation, Tokyo, Japan

[21] Appl. No.: 09/095,552

[22] Filed: Jun. 11, 1998

[30] Foreign Application Priority Data

Jun. 12, 1997 [JP] Japan .................................... 9-154742

[51] Int. Cl.[7] ................................................. B29C 45/16
[52] U.S. Cl. ....................................... 425/126.1; 425/814
[58] Field of Search ............................... 425/126.1, 127, 425/129.1, 814, 545

[56] References Cited

U.S. PATENT DOCUMENTS

| 4,505,659 | 3/1985 | Chijiishi et al. ...................... 425/126.1 |
| 4,599,065 | 7/1986 | Takahashi ................................ 425/814 |
| 5,604,962 | 2/1997 | Mayerhofer ............................. 425/814 |

Primary Examiner—Tim Heitbrink
Attorney, Agent, or Firm—Hill & Simpson

[57] ABSTRACT

An automatic pull tab insertion unit of an insert molding machine can automatically insert a plurality of metal pull tab members fitted to respective sliders of slide fasteners into the insert molding machine in order to form a synthetic resin grip integral with each of the pull tab members. The pull tab insertion unit has a pull tab insertion member for inserting a plurality of pull tab members fitted to respective sliders into the insert molding machine, while holding the sliders, and a positioning member for causing the pull tab insertion device to hold the sliders with the respective pull tab members by pushing the sliders against the pull tab insertion member and positioning the pull tab members. The pull tab insertion member and the positioning device are arranged perpendicularly with each other and adapted to be vertically moved together by a lift-device and pivoted by 90° between a horizontal plane and a vertical plane by a pivoting device. The pull tab insertion member and the positioning member have respective actuation members independently movable to and from the point of intersection and independent actuators for driving the respective actuation members to move in directions to intersect.

7 Claims, 13 Drawing Sheets

INSERTION UNIT FOR INSERTING PULL TABS OF SLIDERS OF SLIDE FASTENERS INTO AN INSERT MOLDING MACHINE

FIELD OF THE INVENTION

This invention generally relates to an automatic pull tab insertion unit, to be applied for an insert molding machine, for automatically inserting a plurality of metal pull tab members of sliders having pull tabs of slide fasteners into the insert molding machine in which a synthetic resin grip is molded integrally with each of the metal pull tab members attached to the slider, the unit and the molding machine being provided in an apparatus for manufacturing sliders for slide fasteners.

BACKGROUND OF THE INVENTION

Pull tabs to be used for sliders of slide fasteners comprising a metal member and a grip integrally molded of synthetic resin such as rubber with the metal member are known and have been designed for the effect of quality, esthetic appeal and/or comfortable touch, as disclosed in Japanese patent Application Laid-Open No. 6-189810. Additionally, it is a popular practice to attach a metal pull tab member to the slider body of a slide fastener in advance, insert the metal pull tab member into the metal mold of an injection molding machine and coat the metal member with synthetic resin while integrally forming a grip of a desired profile. At present, however, the operation of inserting the metal pill tab member attached to the slider body into the injection molding machine and placing it in position is exclusively performed by hand.

While pull tabs of such type can expect the effect of quality, esthetic appeal and/or comfortable touch and hence have been popularly used, they are costly and hence cannot significantly enlarge the market any further because they are manually prepared with poor productivity. Therefore, there is a strong need for technological development that can improve the productivity and reduce the cost of manufacturing such pull tabs.

In view of the above identified need, it is therefore the object of the present invention to provide an automatic pull tab insertion unit of an insert molding machine that can automatically insert a plurality of metal pull tab members fitted to respective sliders of slide fasteners into the insert molding machine in order to form a synthetic resin grip integral with each of the metal pull tab members.

SUMMARY OF THE INVENTION

According to the invention, the above object is achieved by providing a pull tab insertion unit to be used with an apparatus, for manufacturing slider products, comprising an insert molding machine for molding a synthetic resin grip integral with a pull tab member fitted to a slider of a slide fastener. The pull tab insertion unit is adapted to automatically insert the pull tab member into the insert molding machine and characterized by comprising a pull tab insertion device for inserting a plurality of pull tab members fitted to respective sliders into the insert molding machine, while holding the sliders, and a positioning device for holding sliders onto the pull tab insertion device with the respective pull tab members by pushing the sliders against the pull tab insertion device and positioning the pull tab members. The pull tab insertion device and the positioning device are arranged perpendicularly with each other and adapted to be vertically moved together by a lift means and pivoted by 90° between a horizontal plane and a vertical plane by a pivoting means while maintaining the perpendicular arrangement. The pull tab insertion device and the positioning device include respective actuation members independently movable to and from the point of intersection and independent actuator means for driving the respective actuation members to move in directions to intersect.

Preferably, the actuator means of the pull tab insertion device and that of the positioning device are rigidly secured to a single support member, which support member is adapted to be pivoted by 90° by the pivoting means. Preferably, the actuation member of the pull tab insertion device comprises a plate member adapted to move back and forth along the actuating direction of the actuator means and having a plurality of insert-and-support tongues aligned along the front edge thereof, which insert-and-support tongues being adapted to be pivoted between a horizontal position and a suspended position by the pivoting means.

Still preferably, each of the slider insert-and-support tongues comprises a pair of laterally arranged wedge-shaped tongue sections separated from each other by a gap and the tongue sections of each of the tongues are adapted to be inserted into the respective front openings of the corresponding slider body to support the slider. Meanwhile, the actuation member of the positioning device comprises a plurality pairs of pushers adapted to be driven to move back and forth in the actuating direction of the actuator means and, the pushers are resiliently supported in a case body. With such an arrangement, the pushers resiliently push the respective sliders so that the sliders would not be damaged by the pushing force of the pushers.

Preferably, each pair of the pushers comprises push pins for pushing the slider body and a pushing and positioning pin adapted to be inserted into a fitting ring of the pull tab member of the pull tab and push the slider body as well as a mere positioning pin. With this arrangement, the sliders are securely held in position and their pull tab members can be accurately placed in position.

The process of manufacturing sliders by using a preferred embodiment of the invention proceeds in a manner as described below. Firstly, sliders carrying respective pull tab members are sequentially supplied through a chute of a slider feeder to the bottom exit of the chute, keeping a predetermined posture. A slider transfer unit is waiting for the sliders at the bottom exit of the chute. The slider transfer unit comprises a slider support-transfer member adapted to advance horizontally at regular time intervals by a distance according to the number of sliders it carriers, holding the sliders in the same and invariable posture by means of the respective holding sections of a slider support jig of the support-transfer member and exposing part of each of the pull tabs to the outside.

As the sliders are supported by the slider support jig, the slider support-transfer member is driven to move to a position right below the slider pull tab insertion device of the slider pull tab insertion unit according to the invention, where the slider support-transfer member is halted.

Until the transfer is completed, a slider pull tab insertion sub-unit of the pull tab insertion unit is held in a stand-by position, while the slider pull tab insertion device and the slider pull tab positioning device are pivoted together by 90° so that the front end of each of the insert tongues of a comb-shaped insert portion of the slider pull tab insertion member is directed vertically downward.

Once the transfer of the sliders is completed, the slider support jig of the slider support-transfer member is lifted to a given position right under the slider pull tab insertion sub-unit. When the slider support jig is halted at the given position, the lift means of the pull tab insertion unit is operated to lower the actuation member of the pull tab insertion device and cause the insert-and-support tongues to move into the respective front openings of the corresponding sliders supported by the slider support jig.

As the insert-and-support tongues are inserted into the respective front openings of the corresponding sliders, the actuation member of the positioning device is driven to cause the laterally arranged push pins and the pushing and positioning pin of each of the pushers to push and hold the upper wing of the corresponding slider against the insert-and-support tongue so that the slider is held in position by the pushing and positioning pin and the positioning pin inserted into the hole of the pull tab member. Note that the pushers resiliently push the respective sliders for positioning under this condition.

As the sliders are held in position on the respective insert-and-support tongues, the slider support-transfer member is driven to lower the slider support jig from the sliders to the transfer position, leaving the sliders on the respective insert-and-support tongues. Then, the released slider support Jig is retracted to the stand-by position near the bottom exit of the chute and wait there for sliders for the next cycle of operation.

Meanwhile, as the slider support jig starts lowering and moves away from the sliders, the pivoting means is driven to pivot back the slider pull tab insertion device and the slider pull tab positioning device by 90° while keeping their intersecting positions to make the front ends of the insert-and-support tongues horizontally directed to the lower mold half of the injection molding machine. More specifically, the pull tab members aligned and supported by the respective insert-and-support tongues are held horizontally on the respective slider bodies with the front ends directed horizontally and held ready for being inserted into the corresponding cavities of the lower mold half.

Thereafter, the lower mold half of the injection molding machine is made to advance to a position close to the halting position of the actuation member of the slider pull tab insertion device and the actuation member of the slider pull tab positioning device. Then, the pull tab insertion unit is driven to cause these devices to advance toward the lower mold half, while supporting the sliders. As the pull tab members supported by the respective insert-and-support tongues are inserted into the respective cavities of the lower mold half, the actuation member of the slider pull tab positioning device is driven to remove the pushers away from the respective sliders and release the pins that have been pushing and holding the respective sliders in position.

As the pins are released, the actuation member of the slider pull tab insertion device is driven to pull out the insert-and-support tongues from the respective sliders. Under this condition, each of the sliders is held to a state where the pull tab member fitted thereto is inserted into the corresponding cavity of the lower mold half as it is projecting from the slider body that is held on a body supporting surface offset from outer edge of the cavity. Thereafter, the lower mold half retreats and stops at the molding position, and the upper mold half Is lowered to close the mold. Once the mold is closed, molten synthetic resin is injected from the injection nozzles into the respective cavities and a synthetic resin grip is molded integrally with the corresponding pull tab of the slider to complete the manufacture of the slider. The manufactured sliders are then received by a delivery device, which delivers them to the next station.

DETAILED DESCRIPTION OF THE PREFERRED EMBODIMENT

Now, the present invention will be described by referring to the accompanying drawings that illustrate a preferred embodiment of the invention. However, it will be appreciated that the present invention is not limited to the embodiment in any means, which can be modified in various different ways without departing from the scope of the invention.

Figure 1:
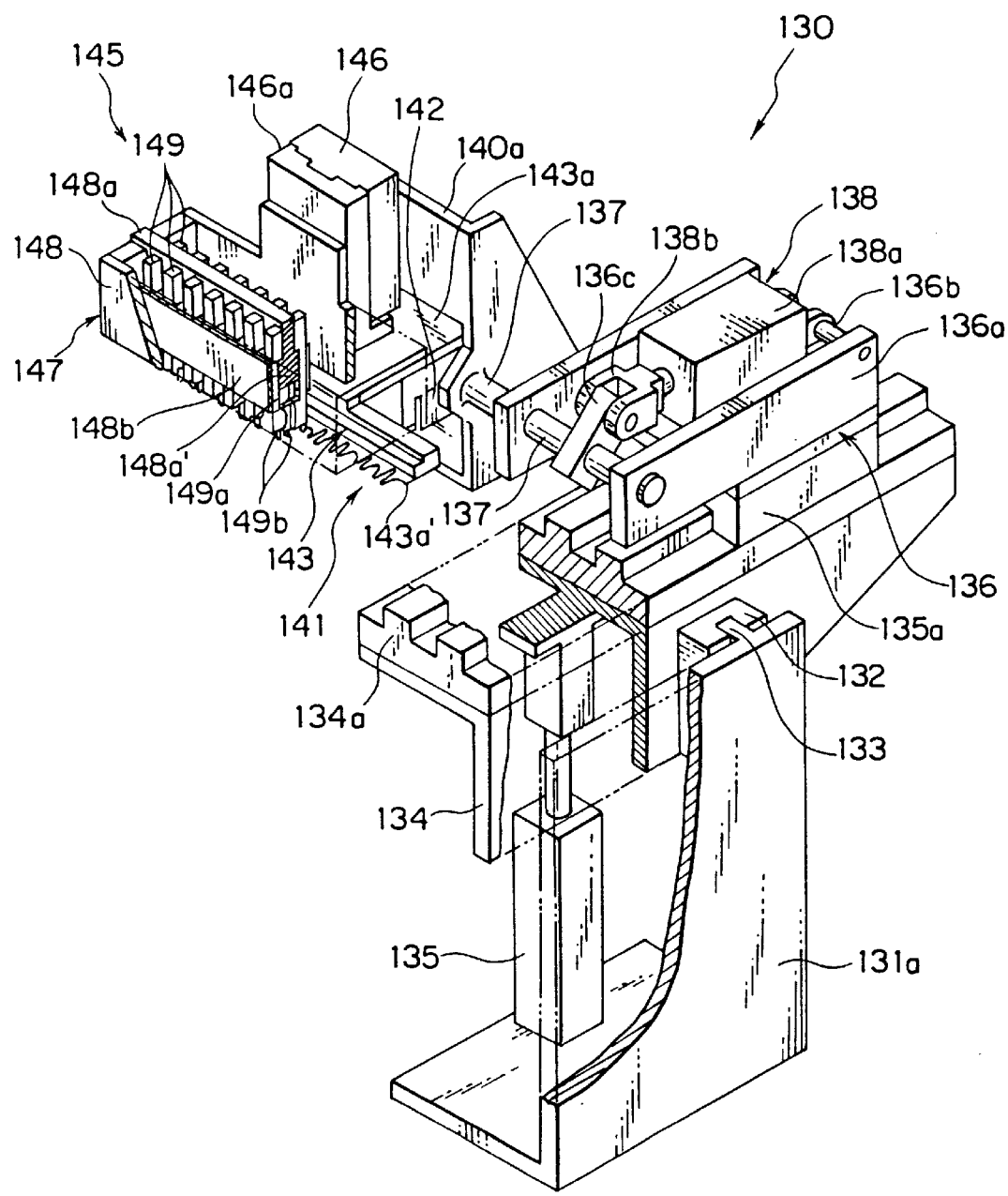
FIG. 1 is a partially cut out schematic perspective view of an embodiment of pull tab insertion unit for inserting sliders of fasteners having respective pull tabs into an injection molding machine.
Figure 2:
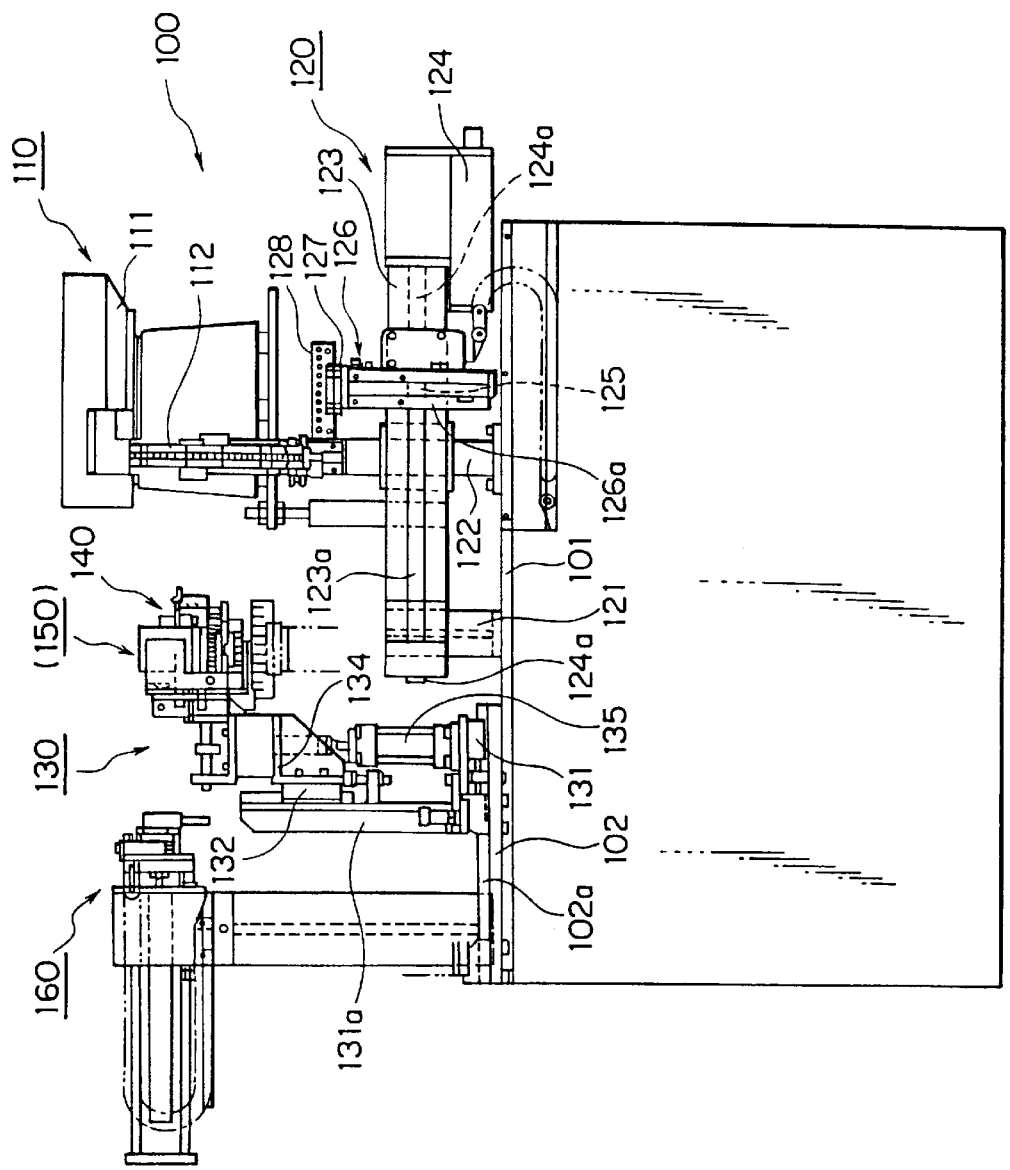
FIG. 2 is a schematic front view of an apparatus for manufacturing sliders for slide fasteners to which the embodiment of pull tab insertion unit of FIG. 1 is applicable.
Figure 3:
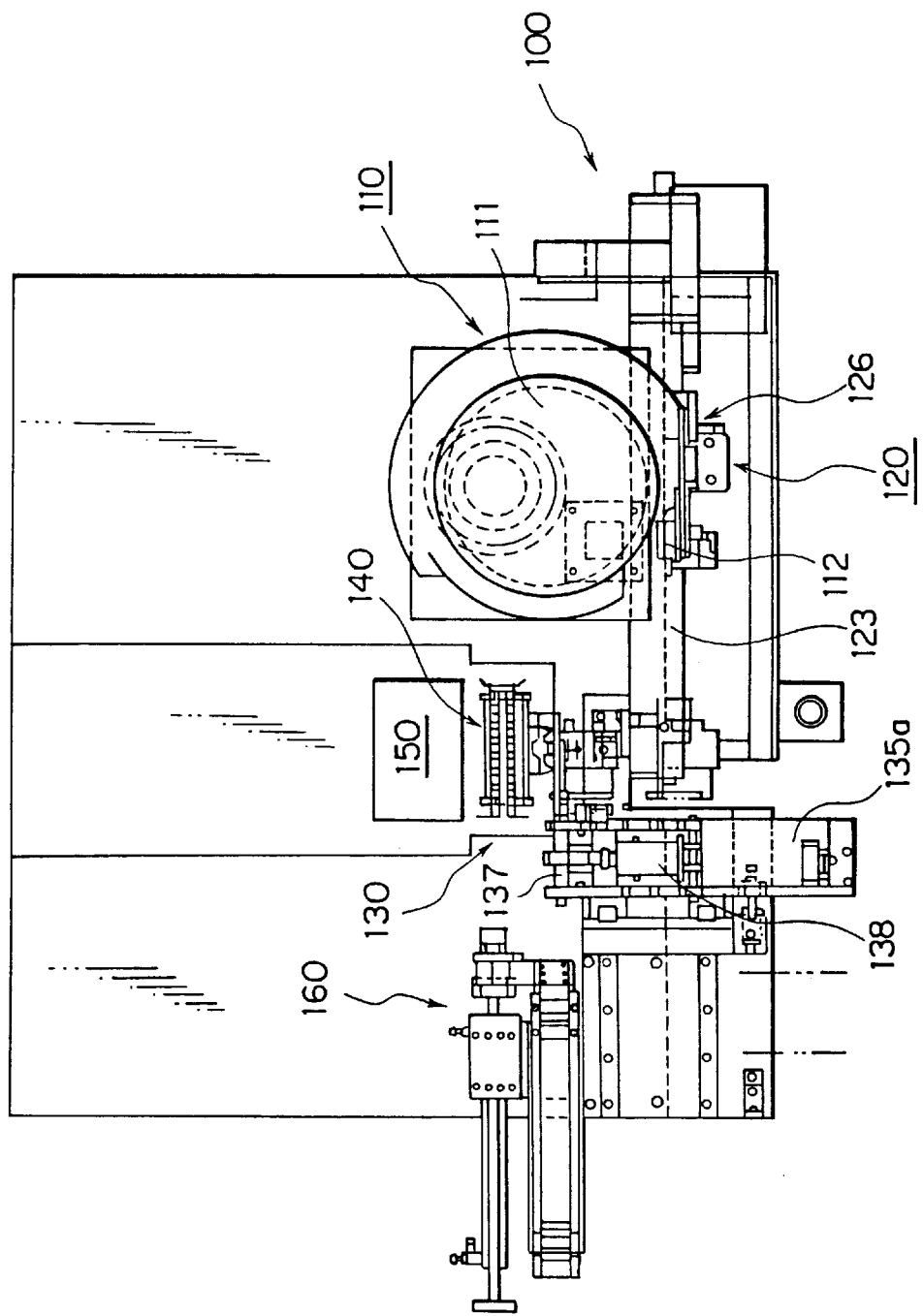
FIG. 3 is a schematic plan view of the apparatus for manufacturing sliders of FIG. 2.
Figure 4:
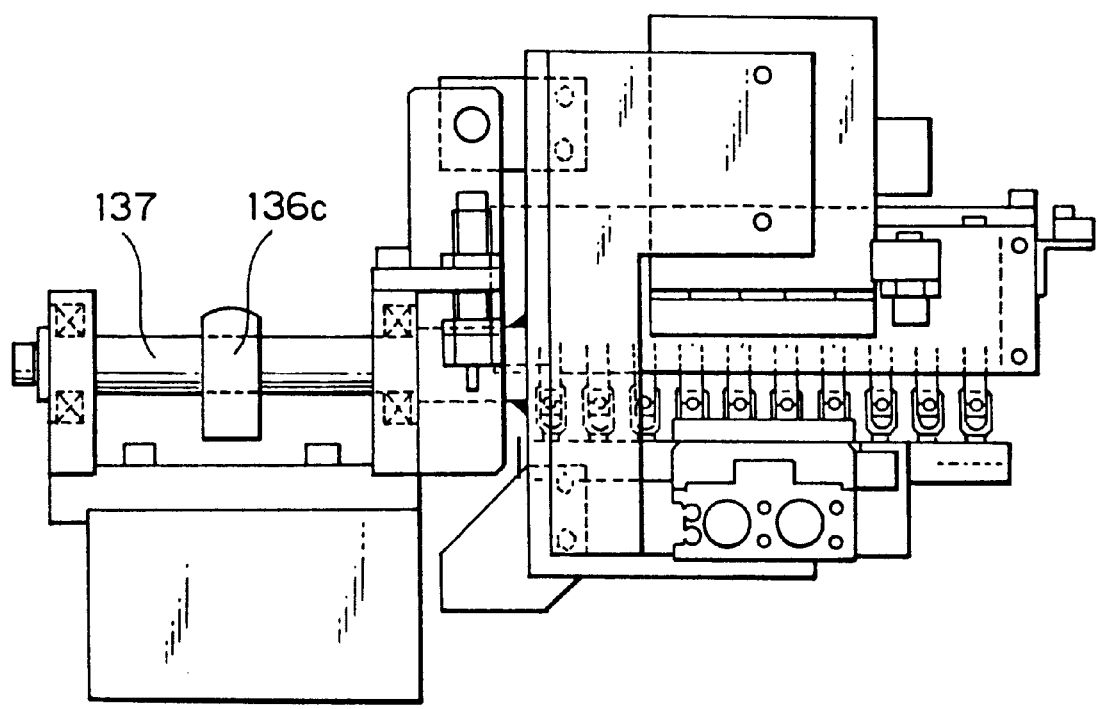
FIG. 4 is a schematic front view of the slider pull tab insertion unit of the embodiment of FIG. 1.
Figure 5:
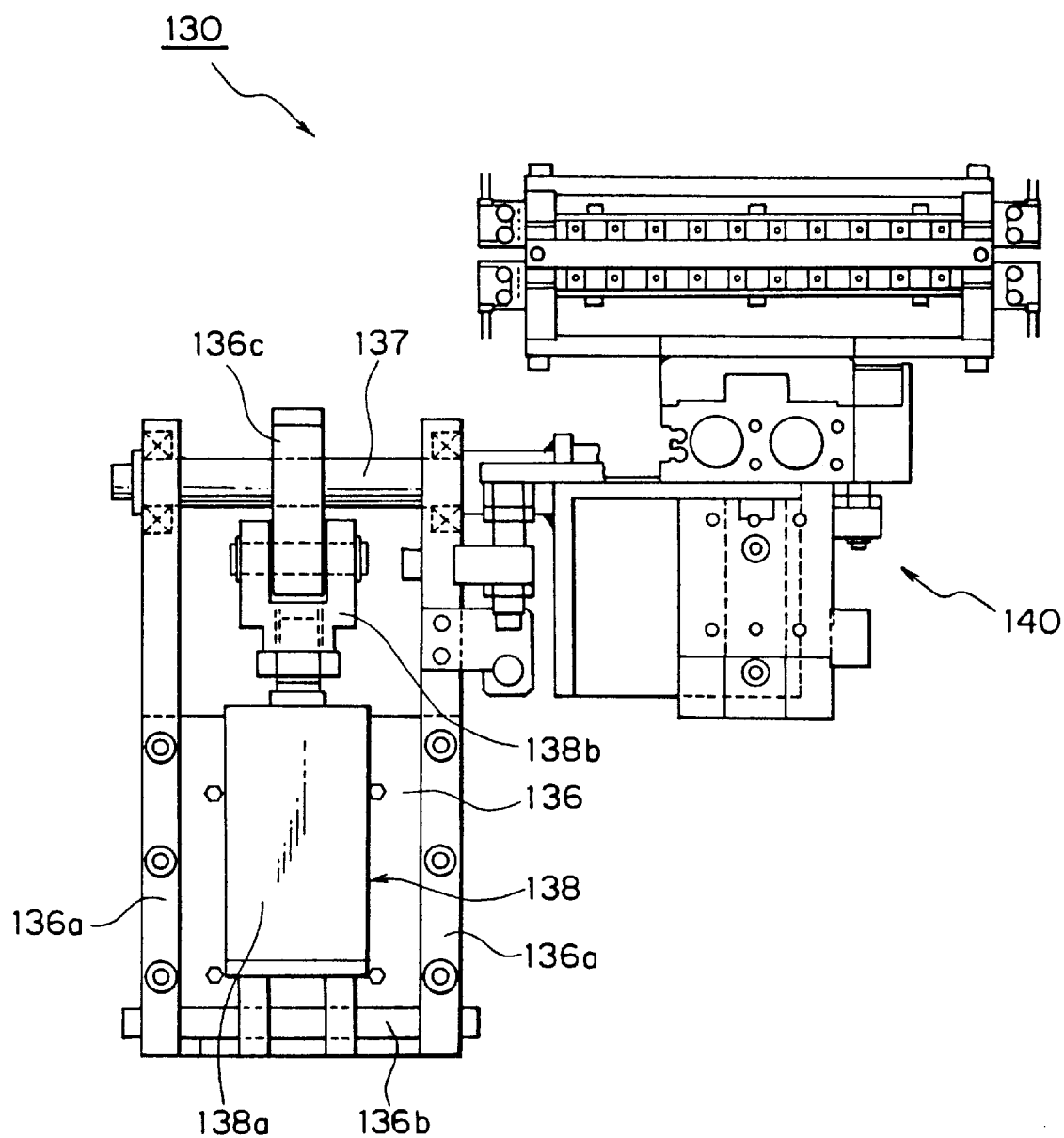
FIG. 5 is a schematic plan view of the insertion unit of FIG. 4.
Figure 6:
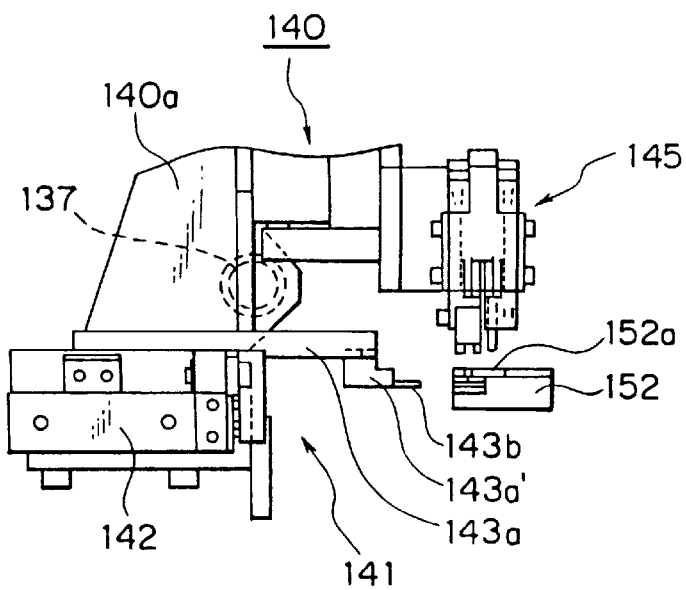
FIG. 6 is a schematic side view of the insertion unit of FIG. 4 in a horizontal attitude.
Figure 7:
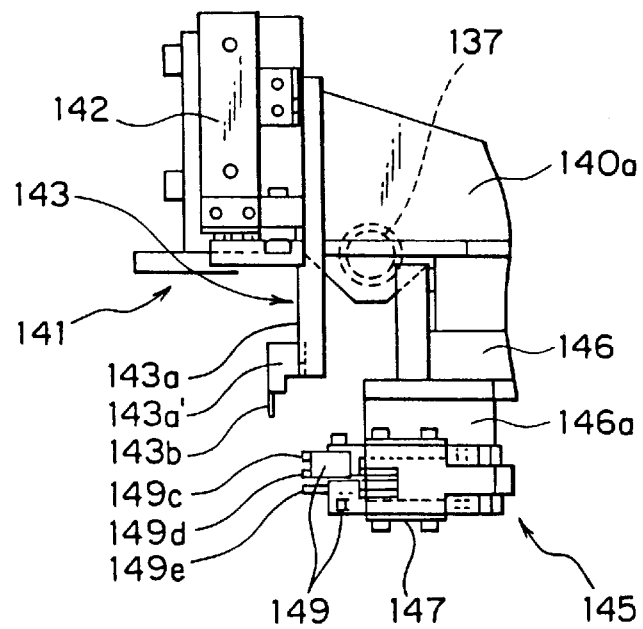
FIG. 7 is a schematic side view of the insertion unit of FIG. 4 when they are directed downward.

FIG. 1 is a partially cut out schematic perspective view of a typical embodiment of a pull tab insertion unit of the invention. FIG. 2 is a schematic front view showing a structural example of an apparatus for manufacturing sliders for slide fasteners to which the unit is applicable. FIG. 3 is a schematic plan view of the apparatus. FIG. 4 is an enlarged front view of a part of the unit of FIG. 1. FIG. 5 is a schematic plan view of the unit. FIG. 6 is a schematic side view of the main part of the unit in a horizontal posture. FIG. 7 is a schematic side view of the main part of the unit when they are directed downward.

Referring to FIGS. 2 and 3, the apparatus 100 for manufacturing sliders for slide fasteners to which the embodiment is applied comprises a slider feeder 110 for supplying slider bodies 2a respectively carrying pull tab members 1a, a slider transfer unit 120 for receiving a predetermined number of sliders 2 from the slider feeder 110, supporting them in an aligned state and transferring them to a pull tab insertion unit 130 according to the invention, the pull tab insertion unit 130 for receiving the transferred sliders 2 from the slider transfer unit 120, inserting them in a metal mold and placing them in position, an injection molding machine 150 for injecting synthetic resin onto the pull tab members 1a fitted to the respective sliders to form a grip 1b on each of the pull tab members 1a as integral part of a pull tab 1 and a slider product delivery device 160 for taking out complete sliders 3 from the injection molding machine 150 and delivering them to the next station.

The slider feeder 110 comprises a known electromagnetic parts-feeder and is adapted to correct the posture of the sliders moving along a helical slider path arranged on an inner wall surface of a bowl 111 and extending from the bottom to the top edge thereof, correcting or ejecting any improperly postured sliders on the way, by means of a known posture corrector/ejector, and move the sliders to a chute 112 connected to the end of the path at the upper edge of the bowl 111, keeping them in identical postures, and then into the slider transfer unit 120 standing by under the lower end of the chute 112.

The slider transfer unit 120 is adapted to move horizontally from the stand-by position shown in FIG. 2 to the pull tab insertion unit 130 of the invention and then upward to the position where a slider pull tab insertion device 141 of the unit 130 waiting for sliders. Then, the unit 130 transfers the sliders 2 to slider pull tab insertion device 141 and returns to the original stand-by position.

Figure 8:
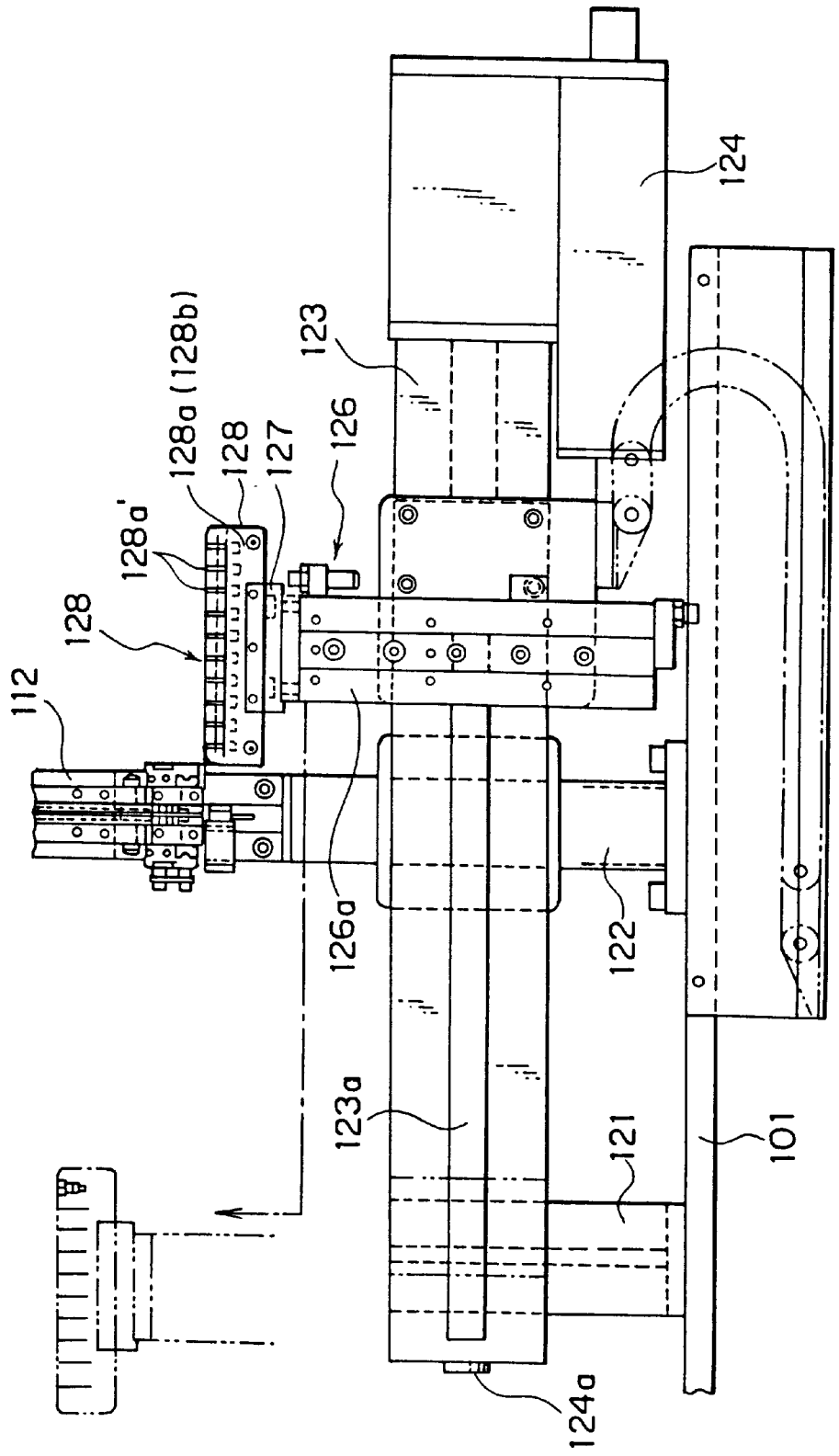
FIG. 8 is a schematic front view of the slider transfer unit of the apparatus of FIG. 2.
Figure 9:
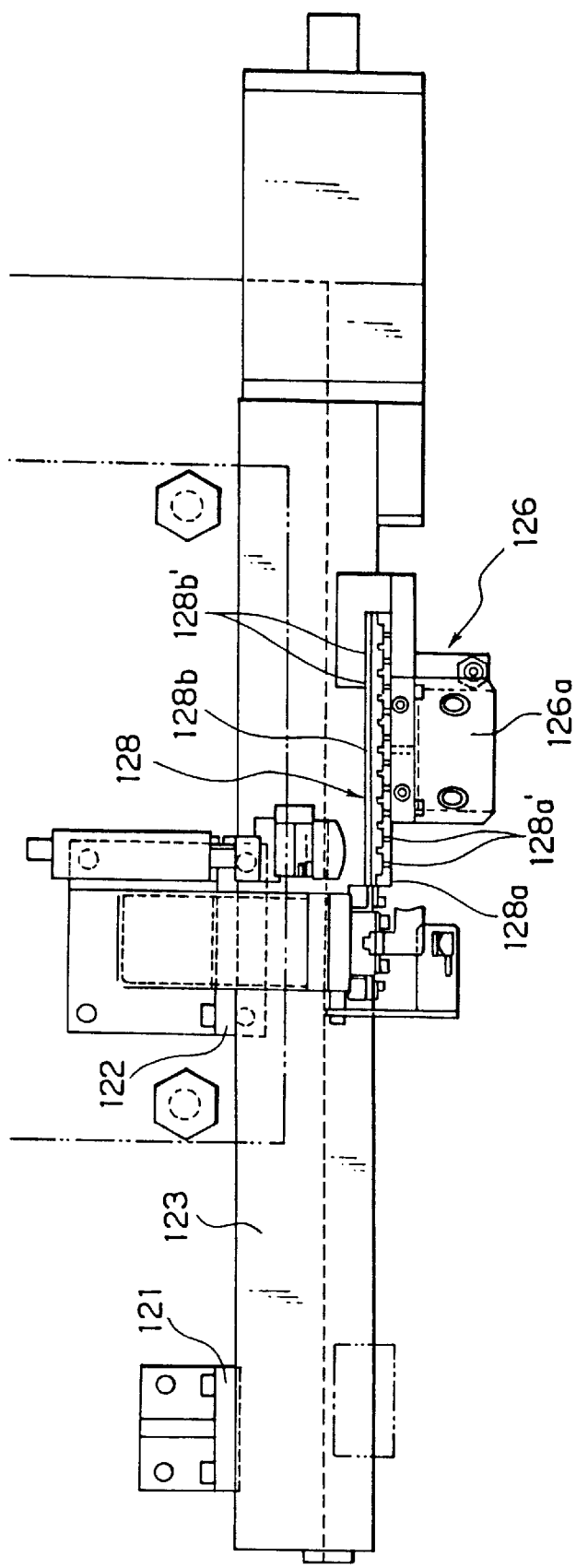
FIG. 9 is a schematic plan view of the slider transfer unit of FIG. 8.
Figure 10:
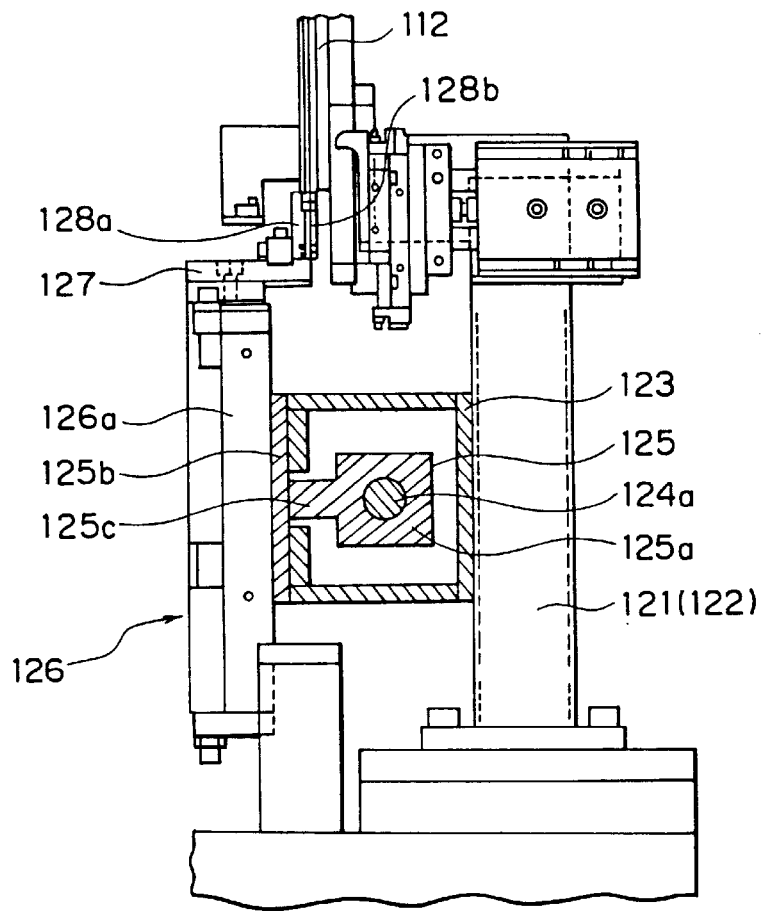
FIG. 10 is a schematic side view of the slider transfer unit of FIG. 8.
Figures 11A, 11B:
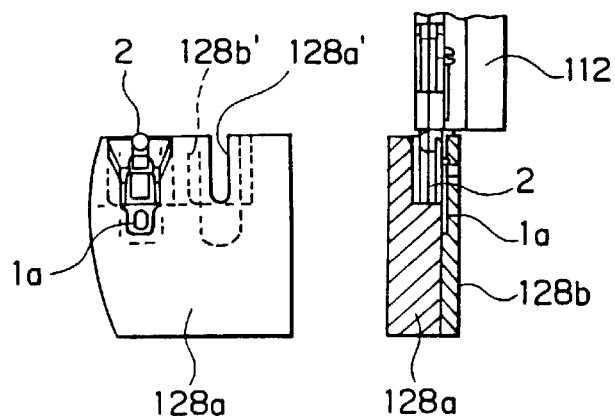
FIGS. 11A and 11B are is a schematic illustration showing how sliders are supported by the slider transfer unit of FIG. 8.

FIGS. 8 through 10 show the slider transfer unit 120 in enlarged scale relative to FIGS. 1 through 7. The slider transfer unit 120 comprises a pair of pillars 121, 122 standing from a base 101, a guide member 123 having a long box shape and arranged in parallel with the surface of a table 102, the guide member 123 being rigidly secured to the pillars 121, 122 and having a slit-like opening 123a extending along the longitudinal direction of the front surface, a servo motor 124 secured to an end of the guide member 123, a ball screw 124a running into and rotatably held by the guide member 123, a link member 125 having an end held in screw engagement with the ball screw 124a and the opposite end projecting to the outside through the slit-like opening 123a and a slider support-transfer member 126 rigidly secured to the projecting end of the link member 125. The slit-like opening 123a has a length equal to the distance between the stand-by position opposite to the pull tab insertion unit 130 with respect to under the lower end of the chute 112 of the slider feeder 110 and the slider transferring position of the pull tab insertion unit 130.

As shown in FIG. 10, the link member 125 comprises a nut section 125a for engaging with the ball screw 124a, an anchor section 125b provided at a projecting end on the other side and made of a plate to be rigidly secured to the slider support-transfer member 126 and a rod 125c for linking the nut section 125a and the anchor section 125b.

The slider support-transfer member 126 comprises a main body 126a that is a hydraulic cylinder rigidly secured to the anchor section 125b of the link member 125 and a slider support jig 128 is standing from an upper end of a piston rod of the main body with a support bracket 127 interposed therebetween and projecting toward the rear side of the guide member 123. As shown in FIGS. 8 through 10, the slider support jig 128 comprises a comb-shaped first plate 128a arranged at the front side and a comb-shaped second plate 128b securely arranged behind the first plate 128a. The comb-shaped first plate 128a has substantially square teeth arranged at regular intervals and separated by longitudinal slits 128a'. In this embodiment, there are arranged a total of ten longitudinal slits 128a'. A space is arranged behind each of the slits 128a' and along the upper edge of the first plate 128a for slidably receiving the body 2a of a corresponding slider 2.

On the other hand, the second plate 128b is provided with longitudinal slits 128b' that are longer than the longitudinal slits 128a' that are arranged along the upper edge of the second plate 128b at positions corresponding to the respective slits 128a' of the first plate 128a. The longitudinal slits 128a', 128b' in alignment serve as optical path of a non-illustrated light-emitter provided in front and at the rear of the slider support jig 128, so that whether the slider 2 is received can be confirmed.

Now, referring to FIGS. 1, 2 and 4 through 7, the pull tab insertion unit 130 of this embodiment comprises a first saddle 131 adapted to reciprocate on a rail 102a arranged on the table 102 in parallel with the direction of movement of the slider support-transfer member 126, a column 131a standing from the first saddle 131, a second saddle 132 adapted to slidingly move vertically along the lateral surface of the column 131a on the side where the slider support-transfer member 126 is located, an inverted L-shaped bracket 134 rigidly secured to the second saddle 132 and adapted to move vertically as guided by a guide rail 133, a lift means 135 in the form of a cylinder having an upper end of its rod secured to a lower surface of the bracket 134 and standing on the first saddle 131, a table 136 rigidly secured to a sliding cylinder 135a movable along a guide rail 134a arranged on the upper surface of the bracket 134 and having a pair of lateral plates 136a (right and left plates in FIGS. 4 and 5), a rotary shaft 137 rotatably supported at the rear ends (upper ends in FIG. 5) of the lateral plates 136a of the table 136 by means of bearings and having an end projecting toward the slider transfer unit 120 , a slider pull tab insertion sub-unit 140 rigidly secured to the projecting end of the rotary shaft 137 and a pivoting means 138 in the form of a cylinder having a main body 138a whose base section is pivotably supported by a fixed shaft 136b extending between the front ends (lower ends in FIG. 5) of the lateral plates 136a and a rod end 138b linked to the rotary shaft 137 by way of a link 136c.

The slider pull tab insertion sub-unit 140 takes a major role in a pull tab insertion unit according to the invention and comprises the slider pull tab insertion device 141 and a positioning device 145 for positioning and holding a plurality of sliders 2 for the slide pull tab insertion device 141. The slider pull tab insertion device 141 and the positioning device 145 are rigidly housed in a single frame 140a rigidly fitted to the projecting end of the rotary shaft 137.

The slider pull tab insertion device 141 comprises a slider pull tab insertion member 143 which serves as an actuation member and is actuated by a first cylinder 142 serving as an actuator means and rigidly secured to part of the frame 140a, whereas the positioning device 145 comprises a second cylinder 146 as an actuator means which is provided perpendicularly to the first cylinder 142 and rigidly secured to part of the frame 140a and a slider pull tab positioning member 147 which serves as an actuation member and is actuated by the second cylinder 146 to move toward and from the insertion end of the slider pull tab insertion member 143.

Figure 12:
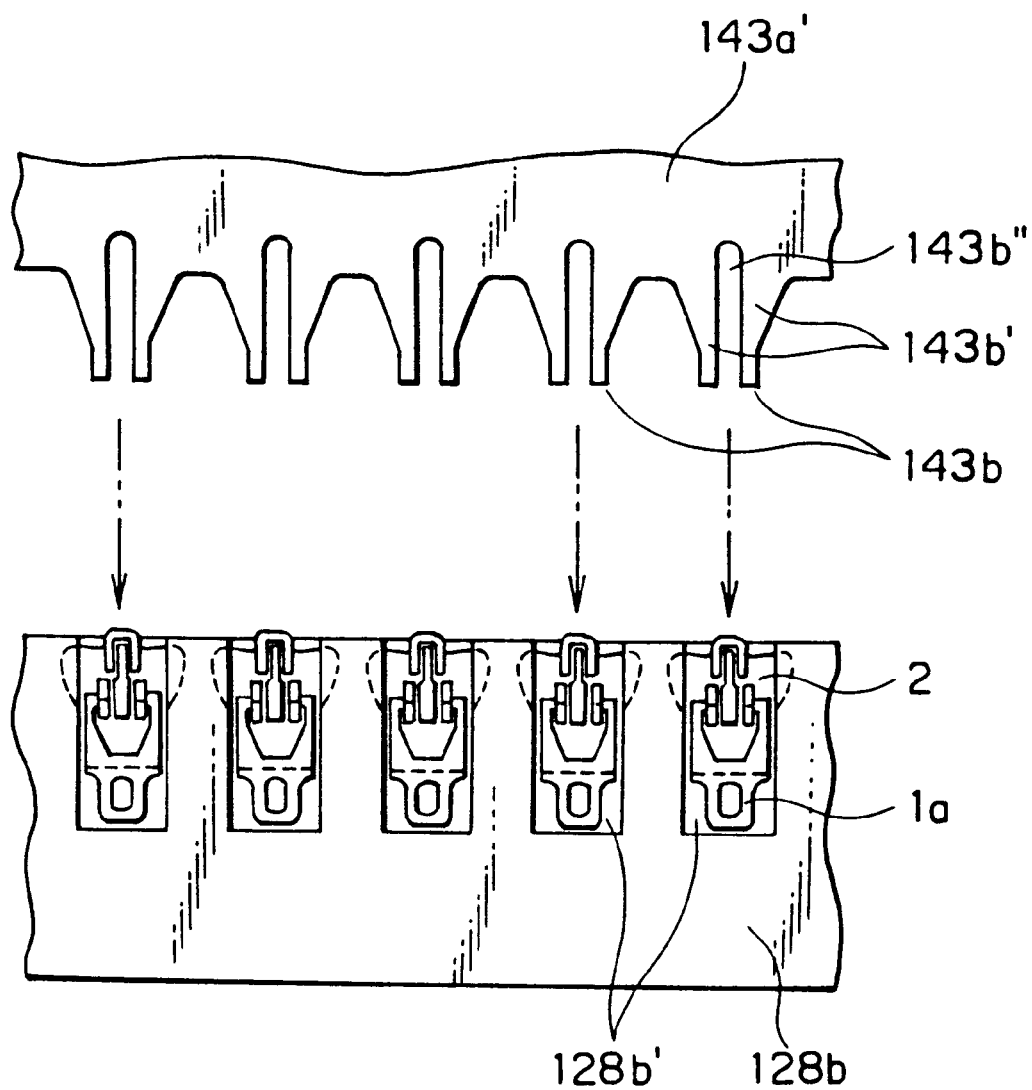
FIG. 12 is a schematic illustration showing how sliders are transferred from the slider transfer unit to the pull tab insertion unit.
Figure 13:
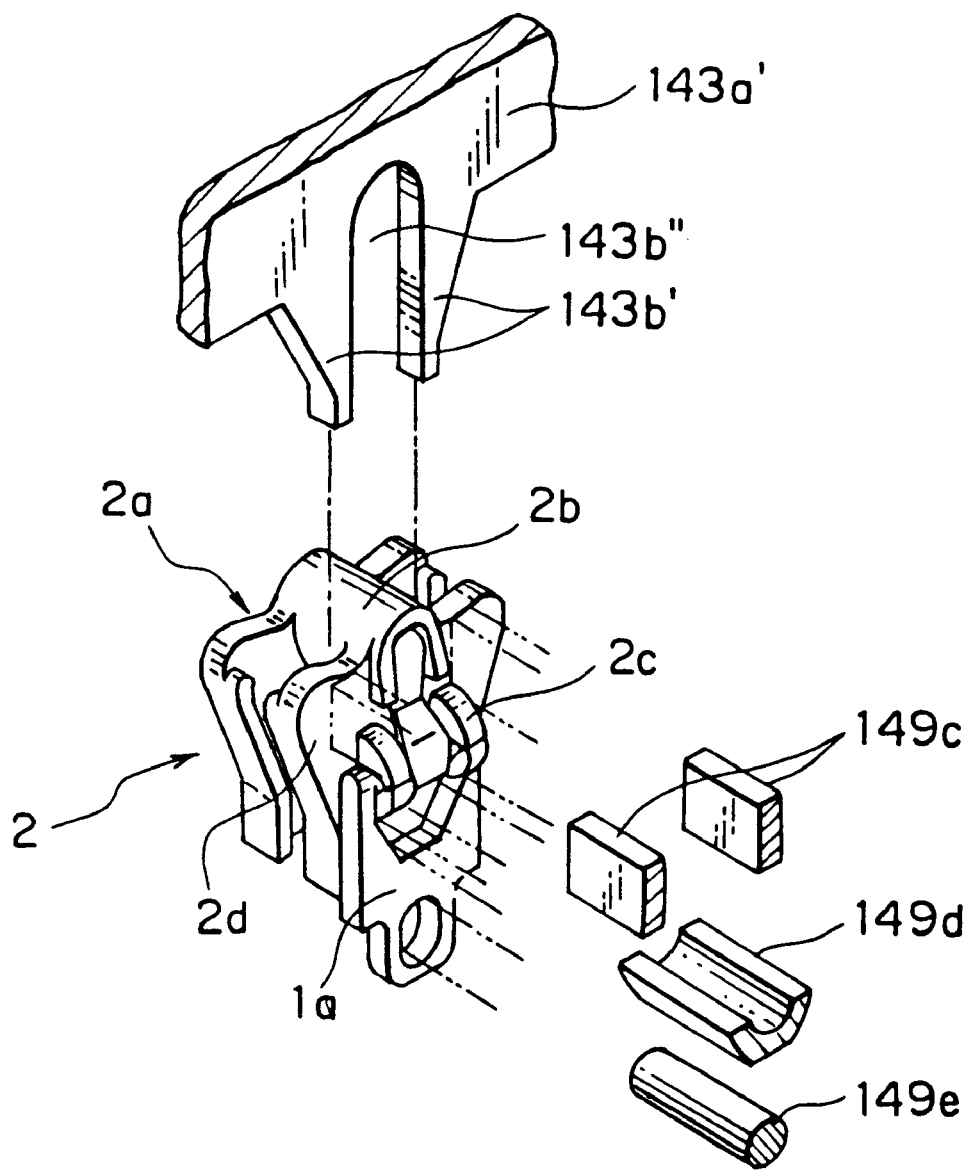
FIG. 13 is a schematic illustration showing how the pull tab insertion unit operates to push and place sliders in position.

The slider pull tab insertion member 143 has a comb-shaped insert portion 143a' in the form of a plate as an offset part of a plate 143a extending from the acting front edge of the plate 143a, which is secured to the piston rod side of the first cylinder 142. The comb-shaped plate 143a' has a plurality of (10 in the illustrated embodiment) insert-and-support tongues 143b. As shown in FIGS. 12 and 13, each of the insert-and-support tongue 143b has a pair of wedge-shaped tongue sections 143b' separated from each other by a central gap 143b" to have generally a mountain shape. The paired tongue sections 143b' are inserted into the front openings of a slider body arranged on opposite sides of a guide post 2b of the slider 2 (FIG. 13) to receive the slider 2 from the slider support-transfer member 126. Then, the slider 2 is supported by the insert-and-support tongue 143b until the pull tab member 1a fitted to the slider 2 is inserted into a predetermined position on a lower mold half 152 of the injection molding machine 150.

Referring now to FIGS. 1, 4 and 5, the slider pull tab positioning member 147 comprises a case body 148 securely arranged at the piston rod side of the second cylinder 146 by way of a sliding member 146a and a plurality of pairs (ten pairs in the drawings) of pushers 149 arranged in parallel rows in the case body 148, which case body 148 is in the form of a rectangularly parallelepipedic frame having a central partition 148a for dividing the inside into two chambers separated along the direction of movement of the second cylinder 146. The aligned pushers 149 are housed in the respective chambers and held to the partition 148a.

Each of the pushers 149 has a substantially C-shaped profile having a central cut-out section 149a. The rows of pushers 149 are arranged on both sides of the partition 148a and held between the partition 148a and a pair of support plates 148b. The partition 148a substantially shows an inverted T-shaped cross section and its horizontally extended portion 148a' is received by the cut-out sections 149a of the pushers 149. The cut-out section 149a has a height greater than the height of the horizontally extending portion 148a' of the partition 148a and a compression spring 149b is arranged for each pusher 149 between the lower surface of the horizontally extended portion 148a' and the lower wall surface of the cut-out section 149a. Therefor e, the pushers 149 are vertically slidable between the partition 148a and the corresponding one of the support plates 148b of the case body 148 and constantly urged downward by the respective compression springs 149b. As shown in FIG. 13, each pair of the pushers 149 is provided at the lower end thereof with a pair of push pins 149c having a substantially rectangular cross section, a pushing and positioning pin 149d having a cross section adapted to be inserted into the annular section of a pull tab 1 fitted to a pull tab fitting pillar 2c of the slider 2 and a positioning pin 149e having a circular cross section, the push pins 149c, the pushing and positioning pin 149d and the positioning pin 149e being projecting in parallel with each other.

The paired push pins 149c are arranged on the pusher 149 at respective positions confronting the base side of the insert-and-support tongue 143b of the slider pull tab insertion member 143 and adapted to push with the front ends thereof the surf ace of an upper wing 2d of the slider 2 supported by the insert-and-support tongue 143b at respective spots that are oppositely disposed relative to the pull tab fitting pillar 2c. The pushing and positioning pin 149d is used for positioning as it is inserted through the annular section of the pull tab 1 and adapted to push the surface of the upper wing 2d at a position located below the pull tab fitting pillar 2c in FIG. 13. Finally, the positioning pin 149e is inserted into a circular hole disposed at the lower end of the pull tab member 1a and holds the pull tab member 1a at a proper position on the insert-and-support tongue 143b in cooperation with the pushing and positioning pin 149d.

Figure 14:
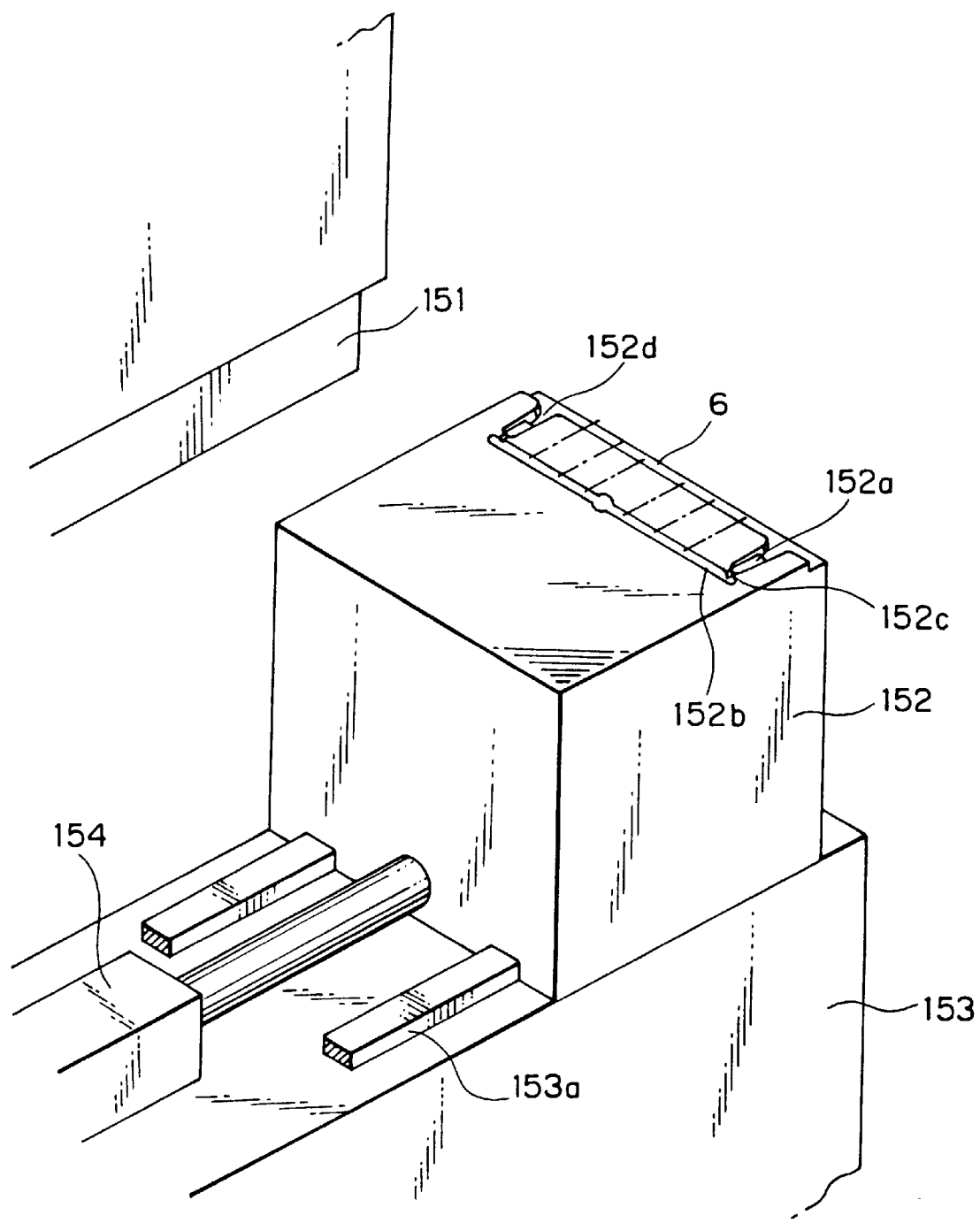
FIG. 14 is an enlarged schematic perspective partial view of the injection molding machine of the apparatus of FIG. 2.

The injection molding machine 150 per se is known and has a configuration typically illustrated in FIG. 14. Therefore, the injection molding machine 150 will be described hereinbelow only briefly. The injection molding machine 150 comprises an upper mold half 151, a lower mold half 152 and an injection unit (not shown). The lower mold half 152 is adapted to be driven to move toward and away from the pull tab insertion unit 130 by a hydraulic cylinder 154 as it is guided by a rail 153a on a base 153. A number of (eight in FIG. 14) identical cavities 152a are arranged on the upper surface of the lower mold half 152 and each of the cavities 152a communicates with a runner 152b by way of a gate 152c. The cavities 152a may have any appropriate profile that corresponds to the profile of the grip members 1b to be formed on and become integral with the respective pull tab members 1a.

The slider products 3 comprising respective grip 1b molded integrally by the injection molding machine 150 are then collected from the injection molding machine 150 and delivered to the next station by means of the slider product delivery device 160. The slider product delivery device 160 per se is also known and does not require any features specifically adapted for the purpose of the invention so that it will not be described here.

Now, the process of manufacturing pull tabs, each comprising a metal pull tab member and a synthetic resin grip as an integral part thereof, by means of the embodiment of apparatus of manufacturing sliders of slide fasteners according to the invention will be described.

The sliders 2 for slide fasteners comprising respective pull tab members 1a are sequentially fed to the bottom exit of the chute 112 of the slider feeder 110. During this feeding, the sliders 2 having improper posture or direction are corrected to the proper posture or ejected from the feeding path. The slider transfer unit 120 is waiting under the exit of chute 112 and, each time a given number of sliders 2 arrive, the slider support-transfer member 126 of the slider transfer unit 120 is made to repeat its advancing motion by a controlled rotary motion of the servo motor 124 along the slit-like opening 123a of the guide member 123, as many times as the number of sliders 2 at the intervals for supporting the sliders 2. The slider bodies 2a are housed in respective spaces formed in the slider support jig 128 of the slider support transfer member 126, taking the posture as illustrated in FIG. 12, and the pull tab members 1a of the pull tabs 1 are exposed to the outside at the rear side as shown in FIG. 8.

As the sliders 2 are housed in the respective spaces in the slider holding jig 128 and supported to take proper attitude by the slider holding jig 128, the servo motor 124 rotates continuously to drive the slider support-transfer member 126 to move along the slit-like opening 123a of the guide member 123 to a position right below the slider pull tab insertion device 141 according to the invention, where the slider support-transfer member 126 is halted.

Until the transfer is completed, the slider pull tab insertion sub-unit 140 of the pull tab insertion unit 130 is held at a stand-by position, while the slider pull tab insertion device 141 and the slider pull tab positioning device 145 are pivoted together by 900 by means of the pivoting cylinder 138 and by way of the link 136c, the rotary shaft 137 and the frame 140a so that the front end of each of the insert-and-support tongues 143b provided along the comb-shaped insert plate 143a' of the slider pull tab insertion member 143 is directed vertically downward. Once the transfer of the sliders 2 is completed, the hydraulic cylinder of the main body 126a of the slider support-transfer member 126 is driven to lift the slider support jig 128 vertically arranged by means of the support bracket 127 to a given position directly under the slider pull tab insert-and-support tongues 143b of the slider pull tab insertion member 143. When the slider support Jig 128 is halted at the given position, the lift cylinder 135 of the pull tab insertion unit 130 is operated to lower the slider pull tab insertion member 143 and cause the pairs of wedge-shaped tongue sections 143b' of the insert-and-support tongues 143b to move into the respective front openings of the corresponding sliders 2 supported by the slider support jig 128.

As the insert-and-support tongues 143b are inserted into the respective front openings of the corresponding sliders 2, the second cylinder 146 of the slider pull tab positioning member 147 is driven to cause the laterally arranged push pins 149c, the pushing and positioning pin 149d and the positioning pin 149e of the pushers 149 to push and hold the upper wing 2d of the corresponding slider 2 against the insert-and-support tongue 143b so that the slider 2 is held in position. The pushing and positioning pin 149d and the positioning pin 149e are inserted into the annular section and the hole of the pull tab member 1a to position it. Note that the pushers 149 resiliently push the respective sliders 2 for positioning under this condition due to the effect of the compression springs 149b.

As the sliders 2 are held in position on the respective insert-and-support tongues 143b, the hydraulic cylinder that is the main body 126a of the slider support-transfer member 126 is driven to lower the slider support Jig 128 from the sliders 2 to the transfer position, leaving the sliders 2 on the respective insert-and-support tongues 143b. Then, the servo motor 124 reversely and continuously rotates to drive the released slider support jig 128 to retreat along the slit-like opening 123a of the box-shaped guide member 123 to the stand-by position near the bottom exit of the chute 112 and the slider support jig 128 waits there for sliders for the next cycle of operation.

Meanwhile, as the slider support jig 128 starts lowering and moves away from the sliders 2, the pivoting cylinder 138 is driven to pivot back the slider pull tab insertion member 143 and the slider pull tab positioning member 147 by 90° by way of the link 136c, the rotary shaft 137 and the frame 140a back to make the front ends of the insert-and-support tongues 143b horizontally directed to the lower mold half 152 of the injection molding machine 150. More specifically, the pull tabs members 1a aligned and supported by the respective insert-and-support tongues 143b are held horizontally on the respective slider bodies 2a of the sliders 2 with the front ends directed horizontally and held ready for being inserted into the corresponding cavities 152a of the lower mold half 152.

Thereafter, the cylinder 154 for the lower mold half 152 of the injection molding machine 150 is driven to make the lower mold half 152 advance to a position close to the halting position of the slider pull tab insertion member 143 and the slider pull tab positioning member 147 . Then, the sliding cylinder 135a of the pull tab insertion unit 130 is driven to cause the slider pull tab insertion member 143 and the slider pull tab positioning member 147 to advance toward the lower mold half 152, while supporting the sliders 2. As the pull tab members 1a of the sliders 2 supported by the respective insert-and-support tongues 143b are inserted into the respective cavities 152a of the lower mold half 152, the second cylinder 146 of the slider pull tab positioning member 147 is driven to retract. As a result, the pushers 149 are moved away from the respective sliders 2 along with the upward movement of the partition 148a and release the pins 149c through 149e that have been pushing and holding the respective sliders 2 in position.

Figure 15:
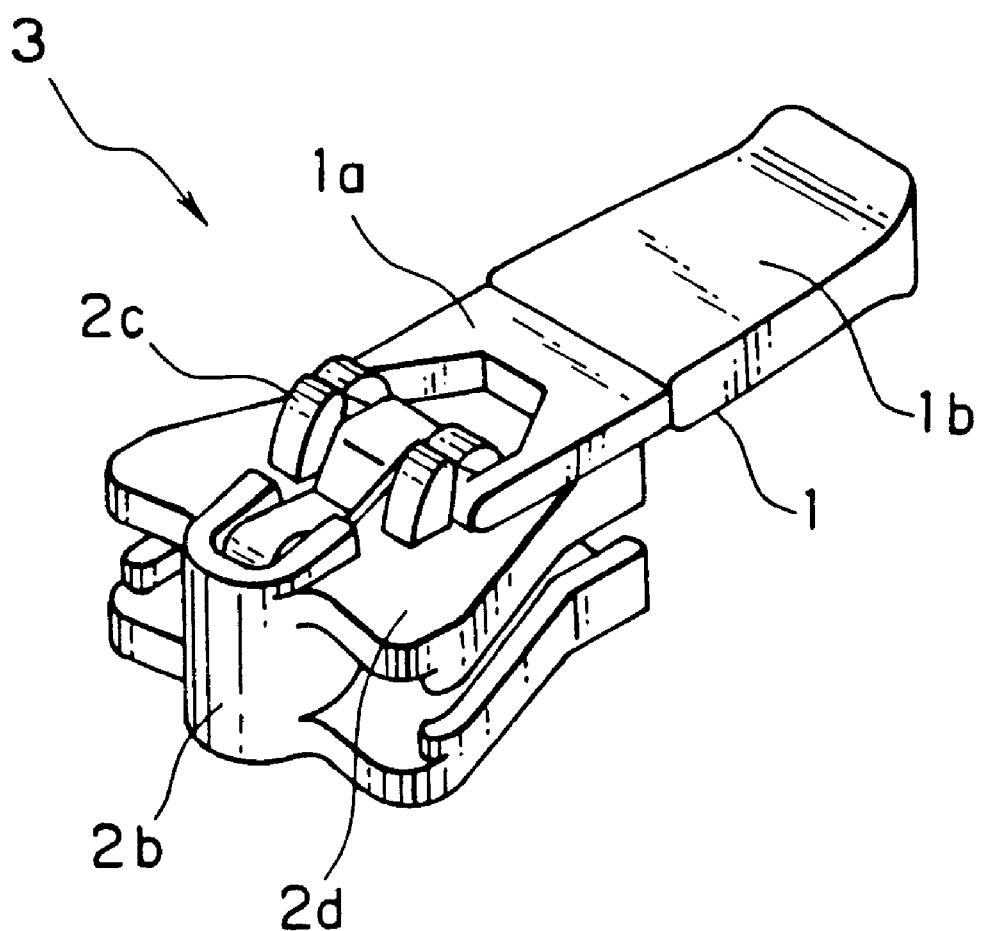
FIG. 15 is a schematic perspective view of a slider of a slide fastener manufactured by the apparatus for manufacturing sliders of FIG. 2.

As the pins are released, the first cylinder 142 of the slider pull tab insertion member 143 is driven to pull out the insert-and-support tongues 143b from the respective sliders 2. Under this condition, each of the sliders 2 is held to a state where the pull tab member 1a fitted thereto is inserted into the corresponding cavity 152a of the lower mold half 152 as it is projecting from the rear side of the slider body 2a that is held on a body supporting surface 152d offset from outer edge of the cavity 152a. Thereafter, the lower mold half 152 retreats and stops at the molding position, and the upper mold half 151 is lowered to close the mold by means of a cylinder (not shown). Once the mold is closed, injection nozzles (not shown) abut the sprue (not shown) of the upper mold half 151 and molten synthetic resin is injected from an injection unit (not shown) into the respective cavities 152a by way of the runner 152b and the gate 152c so that the synthetic resin grip 1b having a profile as shown in FIG. 15 is molded integrally with the corresponding pull tab 1 of the slider 2 to complete the manufacture of the slider product 3.

The manufactured slider products 3 are then received by the product delivery device 160, which delivers them to the next station. Since the product delivery device 160 is required to have ordinary features as mentioned earlier, it will not be described here.

As will be apparent from the above description, any known slider manufacturing line comprising a slider feeder, a slider transfer unit, an injection molding machine and a product delivery device can be completely automated by adding the pull tab insertion unit according to the invention. Therefore, a remarkable effect of labor saving and efficiency is realized so that slider products having respective pull tabs provided with a synthetic resin grip that have been costly can be manufactured at reasonably low cost to enlarge the market in various fields of application.

What is claimed is:

1. A pull tab insertion unit to be used with an apparatus, for manufacturing slider products, comprising an insert molding machine for molding a synthetic resin grip integral with a pull tab member fitted to a slider of a slide fastener, said pull tab insertion unit being adapted to automatically insert the pull tab member into the insert molding machine, wherein the unit comprises:

a pull tab insertion device for inserting a plurality of pull tab members fitted to respective sliders into said insert molding machine, while holding the sliders; and a positioning device for holding said sliders onto said pull tab insertion device with the respective pull tab members by pushing said sliders against said pull tab insertion device and positioning said pull tab members;

wherein said pull tab insertion device and said positioning device are arranged perpendicularly with each other and adapted to be vertically moved together by a lift means and pivoted by 90° between a horizontal plane and a vertical plane by a pivoting means while maintaining the perpendicular arrangement, and said pull tab insertion device and said positioning device include respective actuation members independently movable to and from the point of intersection and independent actuator means for driving the respective actuation members to move in directions to intersect.

2. A pull tab insertion unit according to claim 1, wherein said actuator means of said pull tab insertion device and said positioning device are rigidly secured to a single support member, said support member being adapted to be pivoted by 90° by said pivoting means.

3. A pull tab insertion unit according to claim 2, wherein said actuation member of said pull tab insertion device comprises a plate member adapted to move back and forth along the actuating direction of said actuator means and having a plurality of insert-and-support tongues aligned along the front edge thereof, said insert-and-support tongues being adapted to be pivoted between a horizontal position and a suspended position by said pivoting means.

4. A pull tab insertion unit according to claim 3, wherein each of said slider insert-and-support tongues comprises a pair of laterally arranged wedge-shaped tongue sections separated from each other by a gap and the tongue sections of each of the tongues are adapted to be inserted into the respective front openings of the corresponding slider body to support said slider.

5. A pull tab insertion unit according to claim 2, wherein said actuation member of said positioning device comprises a plurality pairs of pushers adapted to be driven to move back and forth in the actuating direction of said actuator means.

6. A pull tab insertion unit according to claim 5, wherein said pushers are resiliently supported in a case body.

7. A pull tab insertion unit according to claim 6, wherein each pair of said pushers comprises push pins for pushing the slider body and a pushing and positioning pin adapted to be inserted into a fitting ring of said pull tab member of said pull tab and push the slider body.

* * * * *